(12) United States Patent
Kopp et al.

(10) Patent No.: US 12,418,063 B2
(45) Date of Patent: Sep. 16, 2025

(54) HEATED BATTERY MODULE

(71) Applicant: Robert Bosch GmbH, Stuttgart (DE)

(72) Inventors: Benjamin Kopp, Remseck Am Neckar (DE); Christian Loew, Stuttgart (DE); Markus Schmitt, Tamm (DE); Roman Marx, Moensheim (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 17/443,658

(22) Filed: Jul. 27, 2021

(65) Prior Publication Data

US 2022/0037719 A1 Feb. 3, 2022

(30) Foreign Application Priority Data

Jul. 28, 2020 (DE) ...................... 10 2020 209 492.6

(51) Int. Cl.
*H01M 10/6571* (2014.01)
*H01M 10/0525* (2010.01)
(Continued)

(52) U.S. Cl.
CPC ... *H01M 10/6571* (2015.04); *H01M 10/0525* (2013.01); *H01M 10/615* (2015.04); *H01M 10/647* (2015.04); *H01M 50/209* (2021.01)

(58) Field of Classification Search
CPC .. H01M 50/20; H01M 50/103; H01M 50/171; H01M 50/204; H01M 50/209; H01M 50/224; H01M 50/249; H01M 50/264; H01M 50/289; H01M 50/293; H01M 2220/20; H01M 10/0481; H01M 10/0525; H01M 10/058; H01M 10/60–61; H01M 10/615; H01M 10/63; H01M 10/64; H01M 10/647; H01M 10/653; H01M 10/654; H01M 10/6554–6555; H01M 10/6557; H01M 10/6568; H01M 10/6571; H01M 10/613; H01M 10/625;
(Continued)

(56) References Cited

U.S. PATENT DOCUMENTS 9,755,284 B2 9/2017 Nubbe
2013/0108896 A1 5/2013 Daniel et al.
(Continued)

FOREIGN PATENT DOCUMENTS

DE 12011104000 A1 12/2012
DE 102013203196 A1 8/2014
(Continued)

OTHER PUBLICATIONS

DE 102011104000 A1—Machine Translation, Espacenet (Year: 2023).*
(Continued)

*Primary Examiner* — Allison Bourke
*Assistant Examiner* — Bethany C Garcia
(74) *Attorney, Agent, or Firm* — Michael Best & Friedrich LLP

(57) ABSTRACT

A battery module having a multiplicity of battery cells (14), in particular rechargeable lithium-ion battery cells that each have a battery cell housing (16), comprising a side surface that surrounds the inside of the cell, a bottom and a top surface, wherein the side surface and/or the bottom surface of the battery cell housings (16) are/is in physical contact with an electrical resistive heater (30).

19 Claims, 4 Drawing Sheets

(51) Int. Cl.
*H01M 10/615* (2014.01)
*H01M 10/647* (2014.01)
*H01M 50/209* (2021.01)

(58) Field of Classification Search
CPC ............. H01M 10/486; H01M 10/482; H01M 10/637; H01M 10/425; H01M 10/441; H01M 10/443; H01M 50/262; H01M 10/61–617; H01M 10/658; H01M 50/256; H01M 50/517; H01M 50/244; B60L 58/24; B60L 58/27; B60L 1/02; B60L 2240/525; Y02E 60/10; Y02T 10/70; Y02P 70/50; H05B 3/34–347; H05B 3/58; H05B 3/56; H05B 3/565; H05B 3/342; H05B 3/345; H05B 3/06; H05B 2203/007; H01C 10/10–106; H02J 7/0045; H02J 7/00; H02J 7/0031; H02J 7/0042; H02J 7/007192; H02J 7/1423; H02J 7/007194

See application file for complete search history.

(56) References Cited

U.S. PATENT DOCUMENTS

| | | | | |
|---|---|---|---|---|
| 2013/0344371 A1* | 12/2013 | Kinoshita | ............... | B60L 50/64 |
| | | | | 429/120 |
| 2014/0087231 A1* | 3/2014 | Schaefer | ........... | H01M 10/6554 |
| | | | | 429/120 |
| 2015/0104686 A1* | 4/2015 | Brommer | ............ | H01M 10/625 |
| | | | | 429/99 |
| 2016/0072161 A1* | 3/2016 | Nubbe | ................ | H01M 50/213 |
| | | | | 429/62 |
| 2016/0322679 A1* | 11/2016 | Landerer | ............. | H01M 10/613 |
| 2017/0222285 A1* | 8/2017 | Li | ..................... | H01M 10/6556 |
| 2017/0253142 A1* | 9/2017 | Buckhout | .......... | H01M 10/486 |
| 2017/0306916 A1* | 10/2017 | Zeiler | ................... | H02J 7/0045 |
| 2018/0198294 A1* | 7/2018 | Sheeks | ............... | H01M 10/6554 |
| 2019/0267686 A1* | 8/2019 | Shimizu | .............. | H01M 10/658 |
| 2021/0184296 A1* | 6/2021 | Lee | ..................... | H01M 10/653 |

FOREIGN PATENT DOCUMENTS

| | | | | |
|---|---|---|---|---|
| DE | 102015010925 A1 | | 3/2016 | |
| DE | 102017130559 A1 | * | 6/2019 | ............... B60K 1/04 |
| JP | 2012243535 A | | 12/2012 | |
| JP | 2017195049 A | * | 10/2017 | |

OTHER PUBLICATIONS

JP-2017195049-A—English Translation (Year: 2017).*
DE-102017130559-A1—English Translation via Espacenet, Accessed Feb. 20, 2025 (Year: 2025).*

* cited by examiner

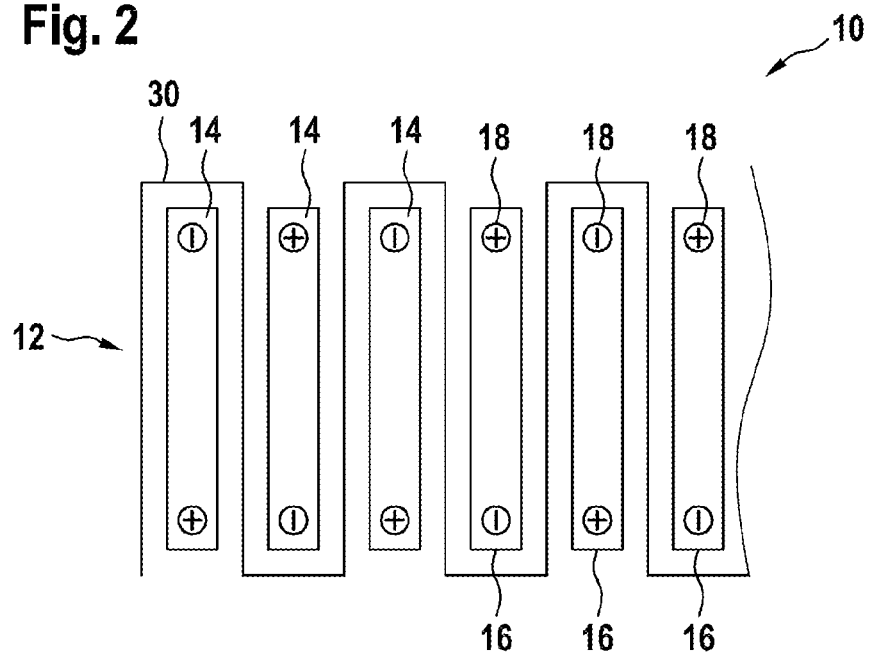
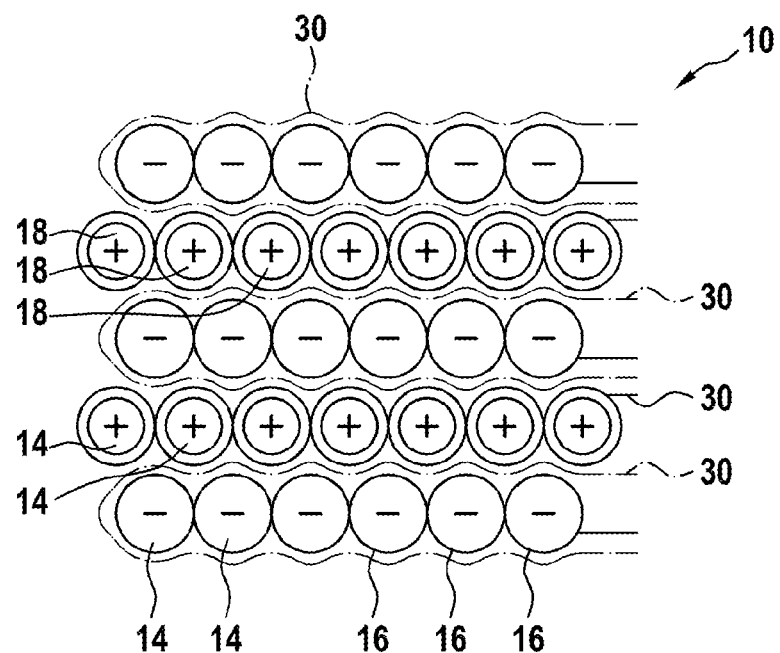

HEATED BATTERY MODULE

BACKGROUND OF THE INVENTION

The present invention relates to a battery module, to a method for operating same and to the use thereof.

Conventional batteries in the field of electromobility comprise a multiplicity of battery cells that are for example grouped together to form a cell stack and are electrically interconnected with one another. Such cell stacks are then introduced into an appropriate battery housing. Owing to electrochemical conversion processes within the battery cells, lithium-ion and lithium-polymer battery cells, especially in the case of a rapid energy output or intake, in particular heat up to a great extent in battery systems. The more powerful a battery pack formed from the battery cells, the greater the corresponding release of heat and the greater the requirement for an efficient active thermal management system.

Besides efficient cooling of the battery cells, the possibility of being able to heat cells, in particular at low temperatures of below 10° C., is however also becoming of increasing importance, since said cells are not necessarily able to be charged at these temperatures, as otherwise there is the risk of what is known as lithium plating. If the intention is to guarantee full energy intake of the battery cells, this requires active heating of the battery cells in order to bring the battery cells to a sufficiently high temperature level.

The temperature of battery cells is nowadays usually controlled by fluid temperature control involving water/glycol mixtures. In this case, an appropriate fluid is routed through channels of a cooling element, arranged for example underneath the stack of battery cells. This cooling element is part of a corresponding cooling circuit.

In this regard, DE 10 2015 010 925 A1 and DE 10 2011 104 000 A1 disclose providing batteries with a cell connector unit and/or a cell voltage tapping unit that comprises a temperature control unit or is in thermally conductive contact with such a unit.

SUMMARY OF THE INVENTION

The present invention relates to a battery module, to a method for operating same and to the use thereof.

What is thus provided is a battery module having a multiplicity of battery cells, these being for example rechargeable lithium-ion battery cells or lithium-polymer battery cells, and having an electrical resistive heating element. The respective battery cells comprise a battery cell housing that in each case comprises a for example circumferential side surface and a bottom surface and a top surface. The side surface and/or the bottom surface of the battery cell housing are/is in physical contact with the electrical resistive heating element.

The specific advantage of this measure is that an electrical resistive heating element takes up far less installation space within a battery module than a temperature control element that is based for example on the flow of a temperature control medium. Due to the direct physical contact between the electrical resistive heating element and appropriate regions of the battery cell housing, such as in particular the side surface or bottom surface of the battery cell housing, it is possible to subject critical regions of the battery cell housing, and thus of the battery cell, to fast and effective temperature control or heating. Targeted heating of the electrodes of a battery cell is of particular significance here, and heating of the side surface of a battery cell is thus particularly effective.

Further advantageous embodiments of the present invention are the subject of the dependent claims.

It is thus advantageous for the electrical resistive heating element to be of flat design, in particular in the form of a strip or of a heating mat. The advantage of this embodiment is that relatively large surface areas of one or more battery cells of the battery module are able to be subjected to uniform heating.

It is furthermore advantageous for the electrical resistive heating element to be designed with a flexible longitudinal extent. Since battery cells are subjected in principle to periodic changes in volume during operation, this results in swelling of the corresponding battery cell housing and—when fastening the in particular flat electrical resistive element to the surface of the battery cell housing—in mechanical stress within same. If the electrical resistive heating element is designed with a flexible longitudinal extent, then it is able to accommodate the periodic changes in volume of the battery cell housing without detaching from the surface thereof.

To this end, the electrical resistive heating element or at least one electrical resistive conductor of the electrical resistive heating element may be of undulating design or comprise suitable loops such that, in the event of extension of the electrical resistive heating element, the undulating regions of those regions of the electrical resistive heating element designed as loops serve as a flexibility reserve and, in the case of an increase in volume of the battery cell, are changed at least partially from an undulating or loop-shaped state to a flat or extended state.

It is thus furthermore advantageous for the electrical resistive heating element to be designed in the form of a heating mat that contains at least one electrical resistive heating conductor in the form of a diagonal web. The advantage of a diagonal web is that, in the event of longitudinal extension thereof, the meshes of the web, although they are deformed, are capable of being able to flexibly follow the longitudinal stretching.

It is also advantageous for the electrical resistive heating element to be adhesively bonded to outer surfaces of the battery cell housing of the multiplicity of battery cells. The advantage of this measure is that of simple and effective fastening of the electrical resistive heating element to the surface of at least one battery cell. The layer thickness of the application of adhesive may furthermore be used to equalize possible manufacturing tolerances of the battery cell stack.

It is furthermore advantageous for an electrical resistive conductor of the electrical resistive heating element to be designed for example in the form of a flexible printed circuit, also referred to as FPC, or in the form of a flexible flat cable, also referred to as FFC.

According to a further advantageous embodiment of the present invention, the battery cells of the battery module are arranged in the form of a battery cell stack, wherein the battery cells of the battery cell stack are fastened in a positionally fixed manner in relation to one another by way of a tightening belt. The tightening belt of the battery module may in this case be designed as an electrical resistive heating element or comprise same. The advantage of this embodiment is that it is not necessary to provide any additional new component for the battery module, this leading to a particularly space-saving embodiment of the battery module.

According to one particularly advantageous embodiment of the present invention, the electrical resistive heating element is arranged at least partially between two battery cells of the battery module that adjoin one another and are part of a battery cell stack of the battery module. This also makes it possible to heat large surfaces or side surfaces of the respective battery cells, and thus allows particularly effective heating of the corresponding battery cells.

According to a further advantageous embodiment, the battery cells of the battery module each have a cylindrical battery cell housing. In this case, it is particularly advantageous for the electrical resistive heating element to at least largely, in particular completely, encompass side surfaces of the battery cells. This leads to particularly effective heating of battery cells of this battery cell type.

Another subject of the present invention is a method for operating the battery module according to the invention. In this case, for example, the real temperature of the battery module is determined and compared with a setpoint temperature of the battery module. It is furthermore checked whether the battery module is currently in an operating state or in a resting state. If the battery module is in an operating state and the current real temperature of the battery module is below the predefined setpoint temperature, then the electrical resistive heating element of the battery module is activated and the battery cells of the battery module are heated.

The battery module according to the invention is advantageously used in electrically or partially electrically operated vehicles, such as electric battery-operated vehicles, fuel cell-operated vehicles, hybrid or plug-in-hybrid vehicles, in battery modules for kitchen appliances or domestic appliances and in stationary storage units for in particular renewably generated electrical energy.

BRIEF DESCRIPTION OF THE DRAWINGS

Advantageous embodiments of the present invention are illustrated in the drawing and described in more detail in the following description of the figures, in which:

FIG. 2 shows the schematic illustration of a battery module according to a second embodiment of the present invention, FIG. 3 shows the schematic illustration of a battery module according to a third embodiment of the present invention, and FIG. 4 schematically shows the sequence of a method for operating a battery module according to the first, second or third embodiment.

DETAILED DESCRIPTION

Figure 1A:
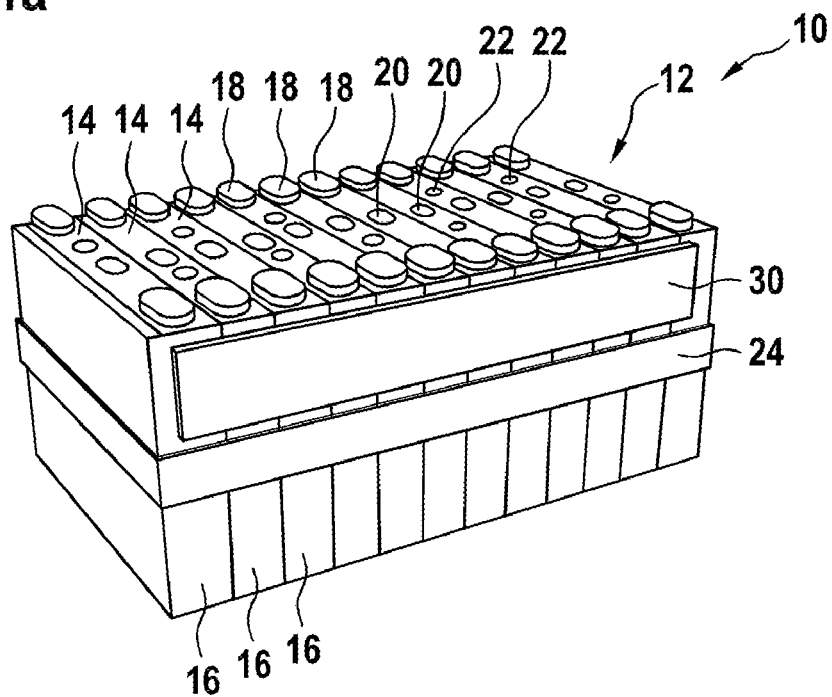
FIGS. 1a to 1d show schematic illustrations of variants of a battery module according to a first embodiment of the present invention.

FIGS. 1a to 1d show different variants of a battery module according to a first embodiment of the present invention. The battery module 10, in a housing (not illustrated), comprises a battery cell stack 12 that comprises a multiplicity of battery cells 14. The battery cells 14 have for example a prism-shaped battery cell housing 16 and form the battery cell stack 12, wherein the battery cell housings 16 of the battery cells 14 are each in physical contact with an adjacent battery cell 14 by way of their large surfaces. The battery cells 14 for their part have battery cell terminals 18 on the top surfaces of their battery cell housings 16, as well as for example an expansion opening 20 and an electrolyte insertion opening 22. The prism-shaped battery cell housings 16 each have a side surface that in each case encompasses the vertically arranged boundary surfaces of the battery cell housing 16, as well as a top surface and a bottom surface.

Provision is furthermore made for an electrical resistive heating element 30 for heating the battery cells 14 of the battery cell stack 12. This is for example of flat design and may for example be designed in the form of a heating mat, a flexible printed circuit (FPC) or as a carrier film, comprising a flexible flat cable (FFC).

In order to guarantee the most effective possible heating of the multiplicity of battery cells 14 of the battery cell stack 12, the electrical resistive heating element 30 is installed for example on an outer surface of the battery cell stack 12, in particular in the longitudinal direction thereof. Such a variant of a battery module 10 is illustrated in FIG. 1a.

Figure 1B:
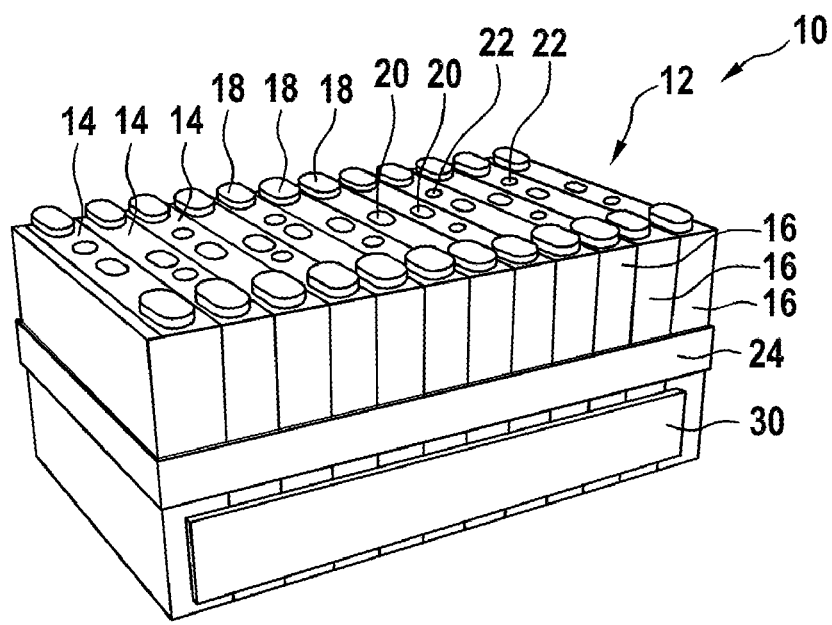

The electrical resistive heating element 30 may in this case be adhesively bonded for example to the battery cell housings 16 of the battery cells 14 of the battery cell stack 12. In this case, the layer thickness of the layer of adhesive is advantageously dimensioned such that manufacturing-induced deviations in the positioning of the battery cells 14 within the battery cell stack 12 are compensated for and the electrical resistive heating element 30 is in thermally conductive contact with the battery cell housings 16 of the battery cells 14 over its entire surface area. A thermally conductive adhesive, for example containing metal filler particles, is advantageously used as adhesive. The electrical resistive heating element 30 may be arranged for example above a bracing belt 24 of the battery module 10, as illustrated in FIG. 1a, or below the bracing belt 24, as illustrated in FIG. 1b.

Figure 1C:
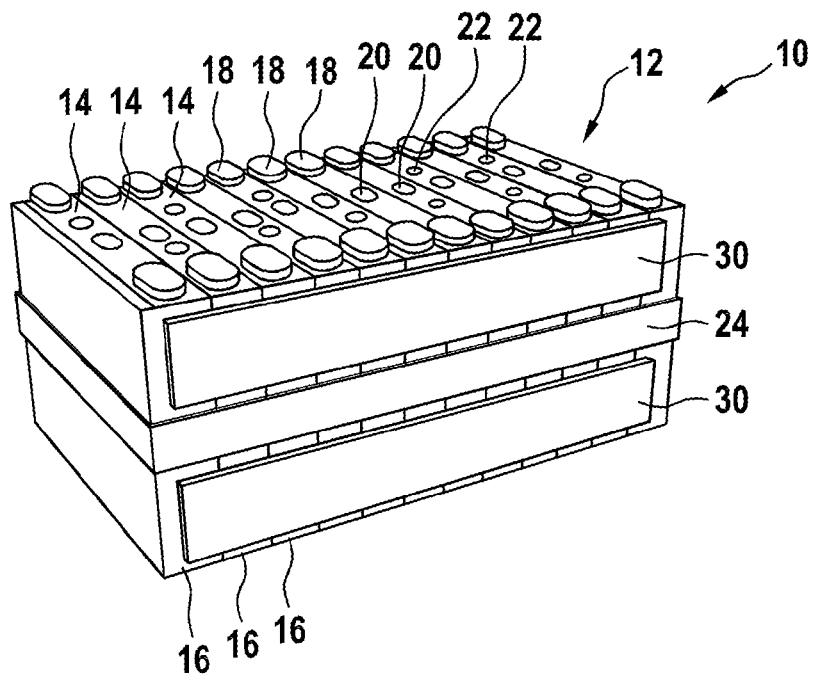

The bracing belt 24 in this case serves to brace the battery cells 14 within the battery cell stack 12 in order to achieve positional fastening of the battery cells 14 within the battery cell stack 12. A further alternative is that of providing two electrical resistive heating elements 30, one being positioned above and one being positioned below the bracing belt 24. Such a variant of the battery module according to the invention is illustrated in FIG. 1c.

Figure 1D:
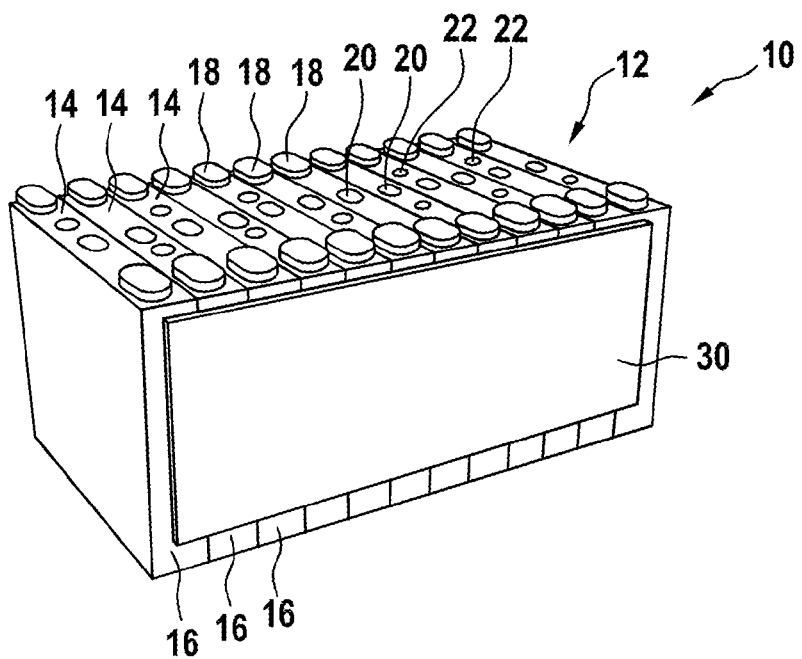

If, owing to the structure of the battery cell stack 12, it is possible to dispense with using a bracing belt 24, then—as illustrated in FIG. 1d—the electrical resistive element may largely or even completely cover a side surface of the battery cell stack 12. As an alternative, it is possible to design the electrical resistive heating elements 30, illustrated by way of example in FIGS. 1a to 1d and at least partially covering only one large surface of the battery cell stack 12, such that they additionally cover end faces of the battery cell stack 12 or furthermore additionally also partially or fully cover a second large surface of the battery cell stack 12. It is thereby possible to effectively prevent the occurrence of thermal stresses within the battery cells 14 of the battery cell stack 12.

A further alternative is that of designing the bracing belt 24 itself as an electrical resistive heating element 30. To this end, this may either itself be designed as an electrical resistive heating element 30 or contain same. To this end, the bracing belt 24 may for example contain electrical resistive conductors that are connected to a suitable external current source.

The electrical resistive heating element 30 is in general connected to an external current source or is in current-conducting contact with battery cells 14 of the battery module 10. The battery module 10 furthermore for example has a temperature measurement unit for determining the real temperature within the battery module 10. Provision is furthermore made for a control device (not illustrated) for operating the electrical resistive heating element 30, by way of which control device the electrical resistive heating element 30 is able to be put into operation or else deactivated.

FIG. 2 illustrates a second embodiment of a battery module according to the invention, the same reference signs denoting the same component parts as in FIGS. 1*a* to 1*d*.

The battery module 10 is illustrated here in a plan view. In this exemplary embodiment, the electrical resistive heating element 30 is designed in a strip shape and is guided, in a zigzagging manner, in each case around the side surfaces of the battery cell housings 16 of the battery cell stack 12. In this case, the electrical resistive heating element 30 is also in thermal contact with the large surfaces of the battery cell housings 16 of the battery cells 14. This achieves even better thermal heating of the battery cells 14.

A third embodiment of a battery module 10 according to the present invention is illustrated in FIG. 3. In this case too, the same reference signs denote the same component parts as in the previous figures.

The battery module 10 according to the third embodiment comprises a multiplicity of battery cells 14 that each have cylindrical battery cell housings 16. In this case, it is advantageous for provision to be made for one or more electrical resistive heating elements 30 that for example at least partially, ideally completely, surround the side surfaces of the in each case cylindrical battery cell housings 16. FIG. 3 shows here, by way of example, a plan view of a multiplicity of battery cells 14, wherein the electrical resistive heating element 30, in each case of flat design, is introduced along the side surfaces of the cylindrical battery cell housings 16 of the battery cells 14 in undulating form in a manner adapted to the surface contour of the cylindrical battery cell housings 16. This also allows effective heating of cylindrical battery cells 14 within a battery module 10 according to the invention.

Figure 4:
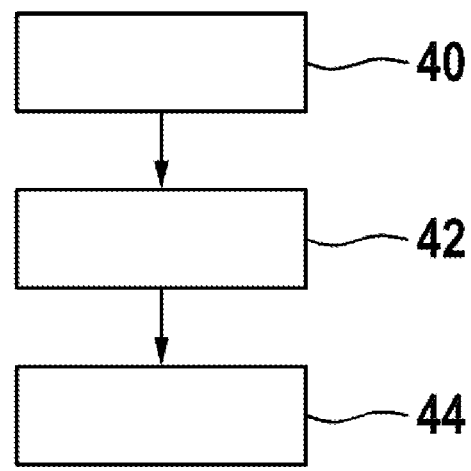

FIG. 4 schematically illustrates the sequence of a method for operating the battery module according to the invention.

In the context of the operating method, in a first step 40, it is first of all checked whether the corresponding battery module according to the invention is in an operating state or in a resting state. If it is identified in a first step 40 that the battery module is in a resting state, then the first step 40 is repeated after a predefined time period. If it is identified, for example by a control unit, that the battery module is in an operating state, then it is checked, in a second step 42, whether the real temperature of the battery module is below a predefined setpoint temperature of the battery module. If this is not the case, then the first step 40 is repeated after a further predefined waiting time.

If it is identified in step 42 that the real temperature of the battery module is below the predefined setpoint temperature, then, in a third step 44, it is put into operation by a control unit of the electrical resistive heating element and the battery module is heated. After a further predefined duration, the third step 44 is performed again and—if it is established that the real temperature of the battery module is identical to or above the predefined setpoint temperature—there is a return to the first step 40. If the temperature of the battery module is still below the predefined setpoint temperature of the battery module, then the third step 44 is repeated again after a further predefined duration.

What is claimed is:

1. A battery module having a multiplicity of battery cells that each have a battery cell housing, comprising a side surface that surrounds an inside of the cell, a bottom surface and a top surface, wherein the multiplicity of battery cells is arranged in the form of a battery cell stack, wherein the battery cells of the battery cell stack are positionally fixed in relation to one another by way of a tensioning belt wrapped around the battery cell stack, wherein the tensioning belt comprises an electrical resistive heating element, and wherein the side surfaces or the bottom surfaces of the battery cell housings collectively form a planar surface in physical contact with the electrical resistive heating element.

2. The battery module according to claim 1, characterized in that the electrical resistive heating element is of flat design.

3. The battery module according to claim 1, characterized in that the electrical resistive heating element is configured with a flexible longitudinal extent.

4. The battery module according to claim 1, characterized in that the electrical resistive heating element is configured in the form of a heating plate that contains at least one electrical resistive conductor in the form of a diagonal web.

5. The battery module according to claim 1, characterized in that the multiplicity of battery cells are equipped with a prism-shaped battery cell housing and are braced with one another so as to form the battery cell stack, and in that the electrical resistive heating element is installed on an outside of the battery cell stack in a longitudinal direction.

6. The battery module according to claim 1, characterized in that the electrical resistive heating element is adhesively bonded to an outer surface of at least one battery cell housing of the multiplicity of battery cells.

7. The battery module according to claim 1, characterized in that an electrical resistive conductor of the electrical resistive heating element is configured in the form of a flexible circuit board or of a flexible flat cable.

8. The battery module according to claim 1, wherein the electrical resistive heating element runs at least partially between two battery cells adjoining one another in the battery cell stack.

9. The battery module according to claim 1, characterized in that the multiplicity of battery cells has a prism-shaped battery cell housing, and in that the electrical resistive heating element at least partially encompasses the side surface of the respective prism-shaped battery cell housing.

10. A method for heating a battery module according to claim 1, wherein the resistive heating element is activated as soon as a measured real temperature of the battery module drops below a predetermined setpoint temperature of the battery module.

11. A device comprising the battery module according to claim 1.

12. The device according to claim 11 wherein the device is an electrically or partially electrically driven vehicle or aircraft.

13. The device according to claim 11 wherein the device is an electrical kitchen or domestic appliance.

14. The device according to claim 11 wherein the device is a stationary storage unit.

15. The device according to claim 11 wherein the device is a stationary storage unit for storing renewably generated electrical energy.

16. The battery module according to claim 1, wherein the multiplicity of battery cells are rechargeable lithium-ion battery cells.

17. The battery module according to claim 16, characterized in that the electrical resistive heating element is of flat design and is strip-shaped or in the form of a heating mat.

18. The battery module according to claim 16, characterized in that the electrical resistive heating element is configured with a flexible longitudinal extent, wherein the electrical resistive heating element or an electrical resistive conductor of the electrical resistive heating element is of undulating design.

19. The battery module of claim 1, wherein the electrical resistive heating element of the tensioning belt is a first electrical resistive heating element, the battery module further comprising a second electrical resistive heating element distinct and separate from the first electrical resistive heating element.

* * * * *